May 14, 1940.     E. H. LAND     2,200,959
DISPLAY DEVICE EMPLOYING POLARIZED LIGHT
Filed June 1, 1938
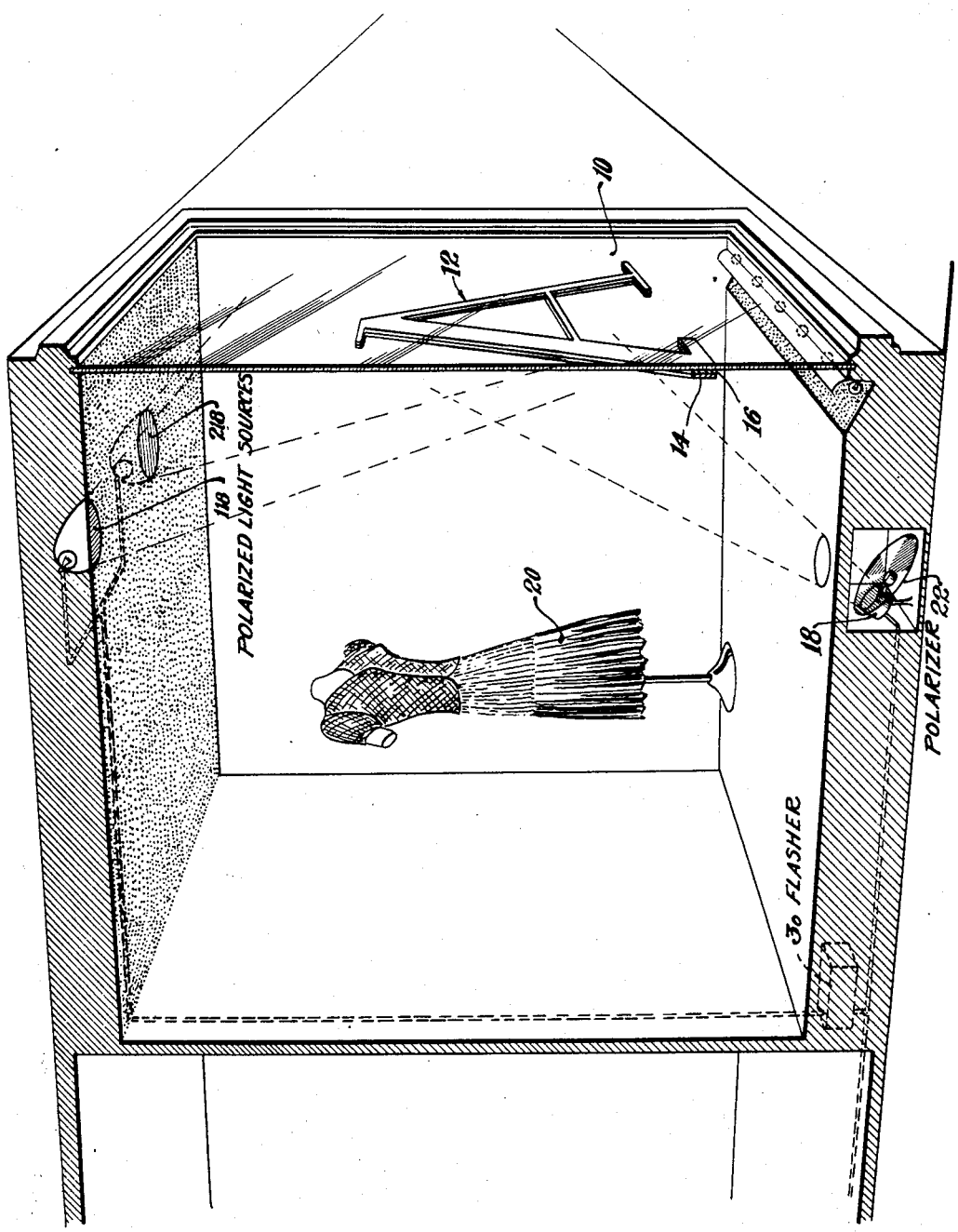
INVENTOR.
Edwin H. Land
BY Brown & Jones
ATTORNEYS Patented May 14, 1940

2,200,959

UNITED STATES PATENT OFFICE 2,200,959

DISPLAY DEVICE EMPLOYING POLARIZED LIGHT

Edwin H. Land, Wellesley Farms, Mass., assignor, by mesne assignments, to Polaroid Corporation, Dover, Del., a corporation of Delaware Application June 1, 1938, Serial No. 211,180

10 Claims. (Cl. 40—130)

This invention relates to an optical system and more specifically to a display system employing polarized light.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Other objects of the invention are to provide apparatus for producing colored effects on a colorless, transparent element, by illuminating the element with colorless, polarized light; to produce such effects which change with a change in position of an observer or which change by reason of a change in the polarizing properties of the illuminating beam; and to produce such effects on a store window.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description, taken in connection with the accompanying drawing, in which there is shown somewhat diagrammatically a device embodying one form of the invention.

This invention is concerned with the production of colored designs, etc., on areas which appear, under certain other circumstances, to be transparent and colorless. It may be understood that devices embodying this invention may be constructed for use in connection with and embodied in many different constructions now in use. The invention is shown diagrammatically in Fig. 1 as incorporated into the show window of a store.

In the drawing, 10 denotes a transparent surface such as a store window associated with which there is a transparent and preferably colorless design 12 shown as the letter A. This design consists of a layer of birefringent material 14 such as Cellophane and a layer of polarizing material 16, preferably so positioned that the polarizing axis of the element 16 is neither parallel with nor perpendicular to a principal optical direction of the element 14. The two layers may be laminated and supplied with an adhesive before being pressed onto the window. If the design 12 is positioned on the inside of the window, then the polarizing layer 16 is placed against the glass, the positions being reversed when the design is on the outside of the support. The design may be made up of prefabricated strips of material. As described, these strips may have the appearance of Scotch tape and may be used to form the lettering, etc., desired.

Either the birefringent material or the polarizing material may cover the entire surface of the support, the design being formed in the other material. If desired, layer 14 may be inside of the glass and layer 16 outside of the glass, either one or both being in the form of the design desired.

A source of light 18 may be positioned anywhere behind the glass 10 but preferably so that one looking directly into the window does not look directly into the light source but at some other object or objects 20. Associated with the light source there is a polarizing element 22 which may be fixedly positioned or movable. Various types of polarizers may be used, for example an element formed of Polaroid or of a layer of oriented polarizing crystals. The element may be mounted so as to rotatably bring various portions thereof between the light source and the window 10. Under such circumstances, the vibration direction of the beam varies with the rotation of the element. The element may have one or more portions cut away so that the design 12 is at times illuminated by unpolarized light. The object 20 is preferably illuminated by unpolarized light, for example from the footlights 40 along the base of the window 10.

When the design 12 is illuminated in polarized light, it appears in color, the color depending on the direction of vibration of the incident beam, the thickness and/or birefringence of the material 14, the relative positions of the optical directions and polarizing axes of the elements, the position of the observer, and other considerations. When the design is illuminated in unpolarized light, it disappears. It is at all times transparent, and objects, such as the object 20, may be visible through the design 12. The light source or sources illuminating the design, if seen by the observer, always appear colorless, unless viewed through the design. It will be apparent that with such apparatus many novel displays may be devised.

There may be a plurality of lights 118 and 218 to illuminate the design 12, in addition to the light 18. Each such light may be provided with means to polarize the beam emanating therefrom. Such a plurality may be directly in the line of sight of an observer or hidden from view. Means, such as flasher means 30 may be provided for energizing the light sources separately, successively, or in any desired combination. For example, in the device shown in the drawing, the light source 18 may be illuminated alternately with the combined light sources 118, 218. Under such circumstances, if the polarizing axes of the polarizing elements intercepting the beams and emanating from the sources 118 and 218 are parallel to each other but angularly positioned with respect to the polarizing axis of the polarizer intercepting the beam from the light source 18, the design 12 will appear differently colored to an observer when the light sources 118, 218 are in use than it will when the light source 18 is in use. So also, the three light sources shown in the drawing may be employed in sequence and individually, and the position of the polarizing axis of the polarizing element intercepting the beam emanating from the source 218 may be non-parallel to the polarizing axis of the element intercepting the beam from the light source 118, and both these polarizing elements may be non-parallel to that intercepting the light from the source 18. Under such circumstances the color of the design 12 will change with each change of the light source illuminating it. All such combinations are to be deemed within the scope of the invention. The polarizing axes of the polarizing elements employed with the different sources may be differently positioned with respect to one another. The apparent color to an observer of the design 12 will depend in part upon the length of the light course through the layer 14. This in turn is dependent upon the relative position of the light source illuminating the design with respect to the observer. So also the apparent color of the design is dependent upon the direction of vibration of the incident polarized light. In the device shown in the drawing the light path to an observer has a different length for each light source, as measured in layer 14, and the observer will see various colors at the same spot, depending upon which light or lights are lighted, and even should the observer not change his position.

Although the surface 10 has been referred to as a store window or the like, it will be understood that any transparent or translucent surface may be employed. Furthermore, the element carrying the design, for example, either the element 14 or the element 16, may be movably mounted with respect to the surface 10 and the other element, especially where the said other element is coextensive with the surface 10, or with that portion thereof intended for use as a field of view.

In some cases, the material of the layers 14 and 16 may be self-supporting and the glass or other translucent supporting surface 10 may be eliminated.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In combination, a light source, means associated with said source to polarize light emanating therefrom, transparent means positioned in the path of light emanating from said source and illuminated thereby providing birefringent means and further light-polarizing means positioned with its polarizing axis at a predetermined angle to a principal optical direction of said birefringent means, said birefringent means being positioned between said two polarizing means, a second light source, and an object illuminated by said source, said source and said object being positioned on the same side of said transparent means as said first-mentioned light source, said object being visible through said transparent means by an observer positioned on the other side thereof.

2. In combination, a light source, means associated with said source to polarize light emanating therefrom, transparent means positioned in the path of light emanating from said source and illuminated thereby providing birefringent means and further light-polarizing means positioned with its polarizing axis at a predetermined angle to a principal optical direction of said birefringent means, said birefringent means being positioned between said two polarizing means, a second light source, an object illuminated by said source, said source and said object being positioned on the same side of said transparent means as said first-mentioned light source, said object being visible through said transparent means by an observer positioned on the other side thereof, and means to alter the direction of vibration of polarized light incident on said transparent means.

3. In combination, a light source, means associated with said source to polarize light emanating therefrom, transparent means positioned in the path of light emanating from said source and illuminated thereby providing birefringent means and further light-polarizing means positioned with its polarizing axis at a predetermined angle to a principal optical direction of said birefringent means, said birefringent means being positioned between said two polarizing means, a second light source, and an object illuminated by said source, said source and said object being positioned on the same side of said transparent means as said first-mentioned light source, said object being visible through said transparent means by an observer positioned on the other side thereof, at least one of the means associated with said transparent means forming a predetermined design when said transparent means is illuminated by said first-mentioned light source.

4. A display device comprising, in combination, an object to be viewed, a transparent screen positioned between said object and an observer, means to illuminate said object, means associated with said transparent screen providing a light-polarizing surface and a birefringent element, the light-polarizing surface being positioned between said birefringent element and an observer and having its polarizing axis positioned at a predetermined angle to a principal optical direction of said birefringent element, said object being visible by an observer through said polarizing element and said birefringent element, and a source of polarized light positioned to illuminate said birefringent element and said polarizing surface.

5. A display device comprising, in combination, an object to be viewed, a transparent screen positioned between said object and an observer, means to illuminate said object, means associated with said transparent screen providing a light-polarizing surface and a birefringent element, the light-polarizing surface being positioned between said birefringent element and an observer and having its polarizing axis positioned at a predetermined angle to a principal optical direction of said birefringent element, said object being visible by an observer through said polarizing element and said birefringent element, and a source of polarized light positioned to illuminate said birefringent element and said polarizing surface, said source of polarized light being hidden from an observer in position to view said object.

6. A display device comprising, in combination, an object to be viewed, a transparent screen positioned between said object and an observer, means to illuminate said object, means associated with said transparent screen providing a light-polarizing surface and a birefringent element, the light-polarizing surface being positioned between said birefringent element and an observer and having its polarizing axis positioned at a predetermined angle to a principal optical direction of said birefringent element, said object being visible by an observer through said polarizing element and said birefringent element, a source of polarized light positioned to illuminate said birefringent element and said polarizing surface, and means to alter the direction of vibration of light emanating from said source and incident on said birefringent means.

7. A display device comprising, in combination, an object to be viewed, a transparent screen positioned between said object and an observer, means to illuminate said object, means associated with said transparent screen providing a light-polarizing surface and a birefringent element, the light-polarizing surface being positioned between said birefringent element and an observer and having its polarizing axis positioned at a predetermined angle to a principal optical direction of said birefringent element, said object being visible by an observer through said polarizing element and said birefringent element, and means to illuminate said birefringent element and said polarizing surface with polarized light whereby color characteristics are imparted to light traversing said element.

8. A display device comprising, in combination, an object to be viewed, a transparent screen positioned between said object and an observer, means to illuminate said object, means associated with said transparent screen providing a light-polarizing surface and a birefringent element, the light-polarizing surface being positioned between said birefringent element and an observer and having its polarizing axis positioned at a predetermined angle to a principal optical direction of said birefringent element, said object being visible by an observer through said polarizing element and said birefringent element, and means to illuminate said birefringent element and said polarizing surface with polarized light whereby color characteristics are imparted to light traversing said element, said illuminating means comprising a plurality of light sources adapted to project differently polarized beams of light.

9. A display device comprising, in combination, an object to be viewed, a transparent screen positioned between said object and an observer, means to illuminate said object, means associated with said transparent screen providing a light-polarizing surface and a birefringent element, the light-polarizing surface being positioned between said birefringent element and an observer and having its polarizing axis positioned at a predetermined angle to a principal optical direction of said birefringent element, said object being visible by an observer through said polarizing element and said birefringent element, means to illuminate said birefringent element and said polarizing surface with polarized light whereby color characteristics are imparted to light traversing said element, said illuminating means comprising a plurality of light sources adapted to project differently polarized beams of light, and means in circuit with said sources for selectively energizing and de-energizing predetermined ones thereof.

10. In a display device, in combination, a plurality of light sources, at least one of said sources being positioned to illuminate an object on display, at least another of said sources being positioned to illuminate a predetermined portion of a transparent screen positioned between said object and an observer, said portion of said screen comprising a birefringent layer and a polarizing layer positioned between said birefringent layer and an observer, said birefringent layer and said polarizing layer forming a predetermined design in color when illuminated by the said other of said sources, and means associated with said source to polarize the beam emanating therefrom and illuminating the said portion of said transparent screen.

EDWIN H. LAND.